United States Patent
Teng et al.

(10) Patent No.: US 8,199,978 B2
(45) Date of Patent: Jun. 12, 2012

(54) METHOD FOR IMAGE AUTO-SELECTION AND COMPUTER SYSTEM THEREOF

(75) Inventors: Chin-Yuan Teng, Taipei (TW);
Kuo-Hsiang Sun, Taipei (TW);
Hsiu-Ling Chiu, Taipei (TW);
Wen-Shiu Hsu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1193 days.

(21) Appl. No.: 11/969,919

(22) Filed: Jan. 7, 2008

(65) Prior Publication Data

US 2008/0170761 A1 Jul. 17, 2008

(30) Foreign Application Priority Data

Jan. 16, 2007 (TW) .............................. 96101566 A

(51) Int. Cl.
*G06K 9/00* (2006.01)
(52) U.S. Cl. ........................................ 382/118; 382/209
(58) Field of Classification Search ............... 348/14.03; 382/118
See application file for complete search history.

(56) References Cited

U.S. PATENT DOCUMENTS

| | | | |
|---|---|---|---|
| 6,301,440 B1 * | 10/2001 | Bolle et al. .................... | 396/128 |
| 6,931,147 B2 | 8/2005 | Colmenarez et al. | |
| 7,315,631 B1 * | 1/2008 | Corcoran et al. ............. | 382/118 |
| 2006/0279643 A1 * | 12/2006 | Levien et al. ............... | 348/231.3 |
| 2007/0047821 A1 * | 3/2007 | Nonaka et al. ................ | 382/224 |
| 2007/0248330 A1 * | 10/2007 | Pillman et al. ................ | 386/107 |
| 2008/0136895 A1 * | 6/2008 | Mareachen ................ | 348/14.03 |
| 2008/0170761 A1 * | 7/2008 | Teng et al. .................... | 382/118 |

FOREIGN PATENT DOCUMENTS

| | | |
|---|---|---|
| CN | 1352436 | 6/2002 |
| CN | 1764238 | 4/2006 |
| TW | 200307224 | 12/2003 |
| TW | I246662 | 1/2006 |

OTHER PUBLICATIONS

"Office Action of Taiwan Counterpart Application", issued on Jul. 26, 2010, p. 1-p. 5.

* cited by examiner

*Primary Examiner* — Gregory M Desire
(74) *Attorney, Agent, or Firm* — Jianq Chyun IP Office

(57) ABSTRACT

A method for image auto-selection and a computer system thereof are provided. In the method, a characteristic value of each of the images is compared with the predetermined characteristic value stored in a characteristic value database, and the images with less difference between the characteristic value and the predefined characteristic values are selected automatically. As a result, the image selection can become more objectively, and the efficiency of image selection can be improved due to the reduction of the manual selection time.

18 Claims, 3 Drawing Sheets

METHOD FOR IMAGE AUTO-SELECTION AND COMPUTER SYSTEM THEREOF

CROSS-REFERENCE TO RELATED APPLICATION

This application claims the priority benefit of Taiwan application serial no. 96101566, filed on Jan. 16, 2007. The entirety of the above-mentioned patent application is hereby incorporated by reference herein and made a part of this specification.

BACKGROUND OF THE INVENTION

1. Field of the Invention

The present invention relates to a method for image auto-selection and, more particularly, to a method for selecting images automatically by comparing characteristic values.

2. Description of the Related Art

With the development of the Internet, various peripheral devices for network are developed and popular, and further become one of requisites in modern life. Wherein a user can make a video communication by a web cam, and the video frame can be transmitted to the other end instantly, so that the communication between people is not limited by the time and space, and the communication manner becomes more convenient. A web cam can be used to capture images besides video frames as a basic camera device.

Generally, the effect of the images captured by a web cam can not satisfy users completely. For this reason, users usually capture several images once in a continuous-shooting manner, and then select more satisfactory ones from these images. However, it is a time-consuming and toilsome action for users themselves to select images, and furthermore it is likely that users can not objectively and accurately select out better ones from the images because of subjective awareness of users themselves or the surrounding environment.

Moreover, if the web cam does not have the function of continuously shooting images, then users must manually operate the web cam to capture images repeatedly for getting multiple images for selecting. In such circumstances, it is likely that users can not display natural expression or concentrate on the lens because users must operate the camera keys, and thereby the photographing results are greatly affected.

SUMMARY OF THE INVENTION

In view of this, the invention provides a method for image auto-selection for selecting more satisfactory images from multiple images automatically in an objective manner.

The invention provides a computer system for executing an image selection operation automatically by comparing the predetermined characteristic value and the characteristic value of each of multiple images.

The invention provides a method for image auto-selection, which includes the following steps. First, a built-in characteristic value database is provided in a system, wherein the characteristic value database stores hundreds of characteristic values obtained from different human images or less characteristic values selected by many people objectively and representing for the characteristics obtained from more beautiful people regard by the common people. Then, multiple images in a predetermined period are captured and a first characteristic value from each image is obtained, respectively. A first distance of each image is calculated according to the first characteristic value of each image and a predetermined value. At least one image is selected from the images according to the first distances of each image.

According to the method for image auto-selection described in a preferred embodiment of the invention, the step of obtaining a first characteristic value from each image, respectively, further includes the step of detecting a first facial region on the image to capture a facial characteristic value of the first facial region as the first characteristic value.

According to the method for image auto-selection described in a preferred embodiment of the invention, the step of calculating a first distance of each image according to the first characteristic value of each image and the predetermined characteristic value further includes the steps of calculating a difference value between the first characteristic value and each predetermined characteristic value and making the average value of the difference values as the first distance of the image.

According to the method for image auto-selection described in a preferred embodiment of the invention, the step of calculating a first distance of each image according to the first characteristic value of each image and the predetermined characteristic value further includes the steps of calculating a difference value between the first characteristic value and each predetermined characteristic value and calculating a weighted average value of the difference values to be the first distance of the image according to a weighted ratio of each predetermined characteristic value.

According to the method for image auto-selection described in a preferred embodiment of the invention, the step of calculating a first distance of each image according to the first characteristic value of each image and the predetermined characteristic value further includes the steps of calculating a difference value between the first characteristic value and each predetermined characteristic value, selecting multiple specific difference values from the difference values according to a selection ratio, and making the average value of the specific difference values as the first distance of the image.

According to the method for image auto-selection described in a preferred embodiment of the invention, the method further includes the steps of obtaining a second characteristic value from each image, respectively, calculating a second distance of each image according to the second characteristic value of each image and each predetermined characteristic value, calculating a third distance of each image according to the first distance and the second distance, and selecting at least one image from the images according to the third distance of each image.

According to the method for image auto-selection described in a preferred embodiment of the invention, the step of obtaining a second characteristic value from each image, respectively, further includes the steps of detecting a second facial region on the image and capturing a facial characteristic of the second facial region as the second characteristic value.

According to the method for image auto-selection described in a preferred embodiment of the invention, the step of calculating a second distance of each image according to the second characteristic value of each image and each predetermined characteristic value further includes the steps of calculating a difference value between the second characteristic value and each predetermined characteristic value and making the average value of the difference values as the second distance of the image.

According to the method for image auto-selection described in a preferred embodiment of the invention, the step of calculating a second distance of each image according to the second characteristic value of each image and each predetermined characteristic value further includes the steps of calculating a difference value between the second characteristic value and each predetermined characteristic value and calculating a weighted average value of the difference values as the second distance of the image according to a weighted ratio of each predetermined characteristic value.

According to the method for image auto-selection described in a preferred embodiment of the invention, the step of calculating a second distance of each image according to the second characteristic value of each image and each predetermined characteristic value further includes the steps of calculating a difference value between the second characteristic value and each predetermined characteristic value, selecting multiple specific difference values from the difference values according to a selection ratio, and making the average value of the specific difference values as the second distance of the image.

According to the method for image auto-selection described in a preferred embodiment of the invention, the step of calculating a third distance of each image includes the step of making the average value of the first distance and the second distance as the third distance of the image.

According to the method for image auto-selection described in a preferred embodiment of the invention, wherein the step of calculating a third distance of each image includes the step of calculating a weighted average value of the first distance and the second distance as the third distance of the image according to a weighted ratio of the first distance and the second distance.

On the other hand, the present invention provides a computer system including a storage unit, an image capturing unit and a processing unit. The storage unit is used for storing a characteristic value database, wherein the characteristic value database records predetermined characteristic values. The image capturing unit is used for capturing multiple images in a predetermined period. The processing unit is coupled with the storage unit and the image capturing unit and used for obtaining a first characteristic value from each image, respectively, calculating a first distance of each image according to the first characteristic value of each image and the predetermined characteristic value, and selecting at least one image from the images according to the first difference values of each images.

According to the computer system described in a preferred embodiment of the invention, the processing unit detects a first facial region on the image and captures a facial characteristic of the first facial region as the first characteristic value.

According to the computer system described in a preferred embodiment of the invention, the processing unit further calculates a difference value between the first characteristic value and each predetermined characteristic value and makes the average value of the difference values as the first distance of the image.

According to the computer system described in a preferred embodiment of the invention, the processing unit calculates a difference value between the first characteristic value and each predetermined characteristic value and calculates a weighted average value of the difference values as the first distance of the image according to a weighted ratio of each predetermined characteristic value.

According to the computer system described in a preferred embodiment of the invention, wherein the processing unit calculates a difference value between the first characteristic value and each predetermined characteristic value, selects multiple specific difference values from the difference values according to a selection ratio, and makes the average value of the specific difference values as the first distance of the image.

According to the computer system described in a preferred embodiment of the invention, the processing unit obtains a second characteristic value from each images, calculates a second distance of each image according to the second characteristic value of each image and each predetermined characteristic value, calculates a third distance of each image according to the first distance and the second distance, and selects at least one image from the images according to the third distance of each image.

According to the computer system described in a preferred embodiment of the invention, the processing unit detects a second facial region on the image and captures a facial characteristic of the second facial region as the second characteristic value.

According to the computer system described in a preferred embodiment of the invention, the processing unit calculates a difference value between the second characteristic value and each predetermined characteristic value, and makes the average value of the difference values as the second distance of the image.

According to the computer system described in a preferred embodiment of the invention, the processing unit calculates a difference value between the second characteristic value and each predetermined characteristic value, and calculates a weighted average value of the difference values as the second distance of the image according to a weighted ratio of each predetermined characteristic value.

According to the computer system described in a preferred embodiment of the invention, the processing unit calculates a difference value between the second characteristic value and each predetermined characteristic value, selects multiple specific difference values from the difference values according to a selection ratio, and makes the average value of the specific difference values as the second distance of the image.

According to the computer system described in a preferred embodiment of the invention, the processing unit calculates the average value of the first distance and the second distance as the third distance of the image.

According to the computer system described in a preferred embodiment of the invention, the processing unit calculates a weighted average value of the first distance and the second distance as the third distance of the image according to a weighted ratio of the first distance and the second distance.

The invention uses the method of comparing the predetermined characteristic value and the characteristic values of multiple images to select the images which are less different from the predetermined characteristic value from the images automatically. Therefore, images can be selected objectively, the time wasted for manual selection is saved to promote the image selecting efficiency.

These and other features, aspects, and advantages of the present invention will become better understood with regard to the following description, appended claims, and accompanying drawings.

DETAILED DESCRIPTION OF THE INVENTION

To make the content of the invention clearer and more understandable, the description with preferred embodiments in detail will be given herein below.

Figure 1:
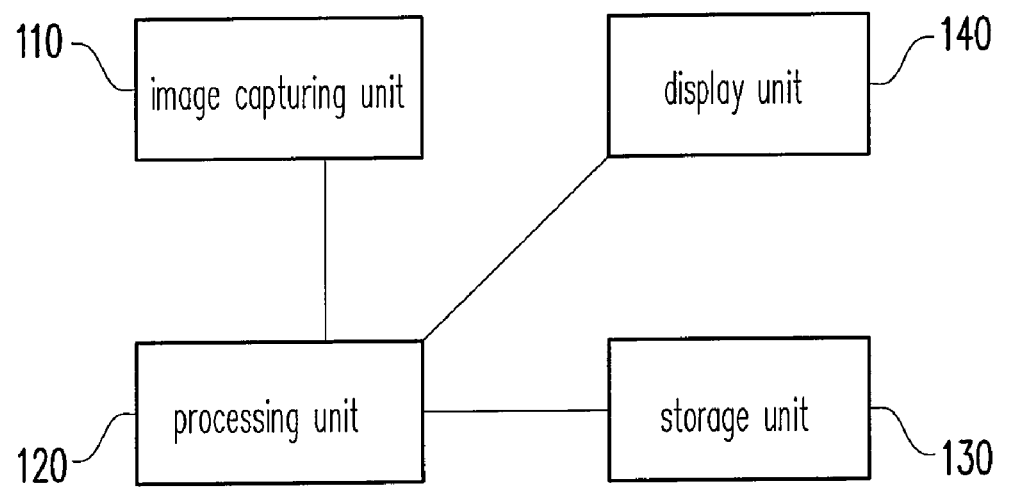
FIG. 1 is a schematic diagram showing a computer system according to a preferred embodiment of the invention.

FIG. 1 is a schematic diagram showing a computer system according to a preferred embodiment of the invention. Referring to FIG. 1, the computer system 100 includes an image capturing unit 110, a processing unit 120, a storage unit 130 and a display unit 140. Wherein, the image capturing unit 110 is used for capturing multiple images in a predetermined period. The storage unit 130 is used for storing a characteristic value database, wherein the characteristic value database records predetermined characteristic values. The processing unit 120 is connected with the storage unit 130 and the image capturing unit 110 and used for obtaining a characteristic value from each image, calculating a distance of each image according to the predetermined characteristic value, and selecting multiple images according to the distances to display on the display unit 140.

Figure 2:
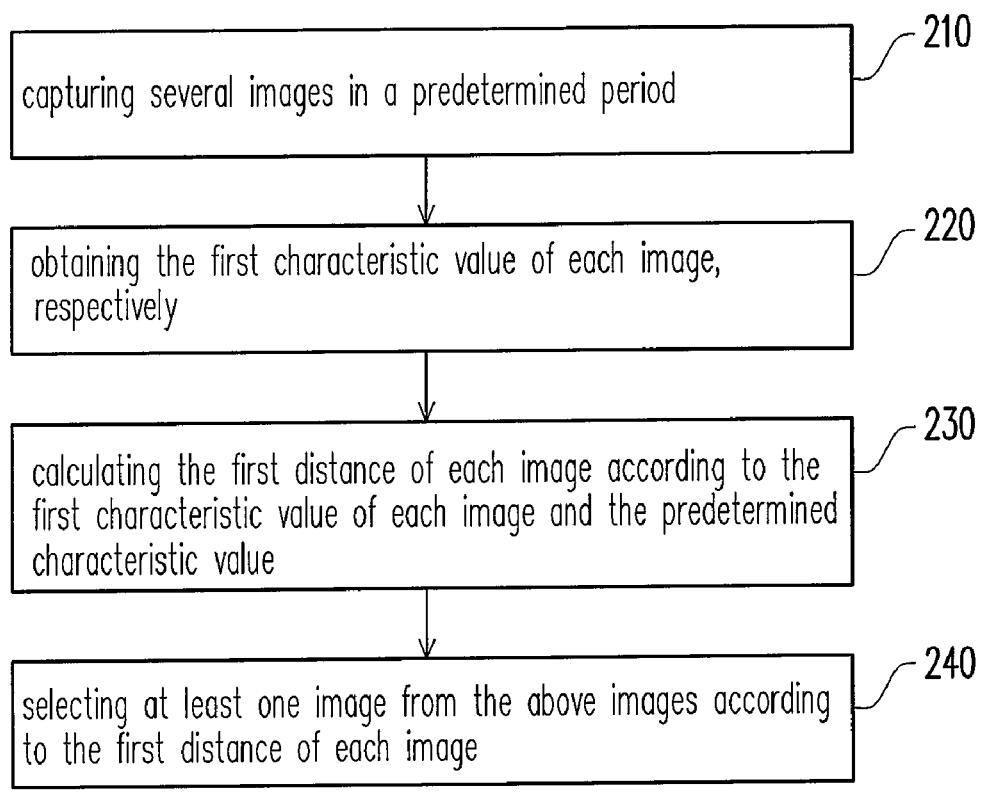
FIG. 2 is a flowchart showing a method for image auto-selection according to a preferred embodiment of the invention.

To make the steps of selecting images of the computer system described in the invention in more detail, another embodiment is given herein below for further explanation. FIG. 2 is a flowchart showing a method for image auto-selection according to a preferred embodiment of the invention. Referring to FIG. 1 and FIG. 2 simultaneously, in the present embodiment, the storage unit 130 of the computer system 100 stores a (or has a built-in) characteristic value database for recording predetermined characteristic values, wherein the characteristic value database records hundreds of predetermined characteristic values obtained from different human images, or less characteristic values selected by many people objectively and representing for the characteristics obtained from the more beautiful people determined by the common people. That is, these predetermined characteristic values are captured according to the characteristics of complexion or facial feature position of many different face images. The source of predetermined characteristic database is obtained by collecting multiple beautiful facial images from network, capturing the characteristic values corresponding to various facial images and loading the captured characteristic value into the characteristic value database.

Referring to the step 210 shown in FIG. 2, firstly, the image capturing unit 110 (such as a web cam) captures several images in a predetermined period (such as 6 second), wherein the predetermined period can be set by users according to need. In general, the longer the predetermined period is, the greater quantity of captured images is.

Secondly, in the step 220, the processing unit 120 obtains a first characteristic value from each image, respectively. The step of obtaining a first characteristic value from each image is, for example, judging whether or not there is at least a facial region in the image through facial detecting technique. In the present embodiment, the technique is, for example, Haar Cascade facial detecting method, which is comparing a set of facial characteristic data table with the captured images, and searching region proximal to face in the images to judge whether or not there is a facial region in the image. However, the facial detecting method stated above is not used for limiting the invention, persons having ordinary skill in the art may use different facial detecting method according to need. And then, if the facial region (which is called first facial region herein below) is detected in the image, the facial characteristic (such as complexion or facial feature position) of the first facial region is captured as the first characteristic value of the image.

In the step 230, for each image, the processing unit 120 calculates a first distance of each image according to the first characteristic value and the predetermined characteristic values stored in the characteristic value database. Wherein, the first distance corresponding to each image shows the diversity degree between the facial region in the image and the predetermined characteristic value stored in the characteristic value database.

In an embodiment, the method of calculating the first distance of an image is, for example, calculating the difference value between the first characteristic value of the image and each predetermined characteristic value at first. The detailed description of the steps of calculating the difference value will be given hereinbelow. To make the description more conveniently, the first characteristic value and each predetermined characteristic value are assumed to be 801 bytes, wherein each byte represents for the data obtained by zooming a point with a specific size in the facial region. Supposing the first bytes (namely, first specific point) of the first characteristic value and one of the predetermined characteristic values are 10000000 and 00001111, respectively, the byte difference value between the first bytes of the first characteristic value and the predetermined characteristic value is 128−15=113. Supposing the byte difference value is limited from 0 to 2 in the embodiment, 113 is normalized to be 0.886 (namely, 113/255×(2−0)). After byte difference values of these 801 bytes are calculated separately, the byte difference values are added and averaged to be the difference value between the first characteristic value and the predetermined characteristic value. And then, the difference value between the first characteristic value and each predetermined characteristic value is calculated by the same method, and the average value of these difference values is made as the first distance of the image.

In another embodiment, after the difference value between the first characteristic value and each predetermined characteristic value is calculated, several difference values in a predetermined selection ratio are selected, and the average value of the selected difference values above is made as the first distance of the image. For example, when the assumed selection ratio is 30%, the order of the value is from little to great, and the average value of former 30% of difference values will be selected to calculate the first distance.

In another embodiment, because the predetermined characteristic values recorded in the characteristic value database are captured separately from different facial images, each predetermined characteristic value is corresponding to a weighted ratio. For example, the weighted ratios corresponding to the predetermined characteristic values captured from the facial images of stars is higher, and the weighted ratios corresponding to the predetermined characteristic values captured from the facial images of ordinary people is lower. Therefore, after the difference value between the first characteristic value and each predetermined characteristic value is calculated, the weighted average value of the difference values is calculated as the first distance of the image according to a weighted ratio of each predetermined characteristic value.

Finally, in the step 240, after the processing unit 120 has calculated the first distance of each image, the image with less first distance is selected from these images and displayed on the display unit 140 according to the first distance of each image. In the embodiment, because the predetermined characteristic values recorded in the characteristic value database are corresponding to the characteristic values captured from facial images of human beings enjoyed (or considered to be beautiful) by users, the less first distance is, the closer the facial region on the image is to the aesthetic standard of users.

In an embodiment, a general web cam can capture at least 15 images per second, and then the method for image auto-selection according to the embodiment can automatically select images (such as six pieces of images) which are most corresponding to the setting of users from nearly hundred pieces of images in a predetermined period (such as six seconds). According to the results above, users make a selection manually, and therefore, users can not only get selected images objectively, but also save much selection time.

In another embodiment, supposing the images captured by the web cam includes more than one person, the diversity degree between the characteristic value of the facial region of each person and the predetermined characteristic value will be calculated, and the combination of the diversity degrees is used to determine whether the image is selected. The steps of selecting multi-person images will be given herein below.

Figure 3:
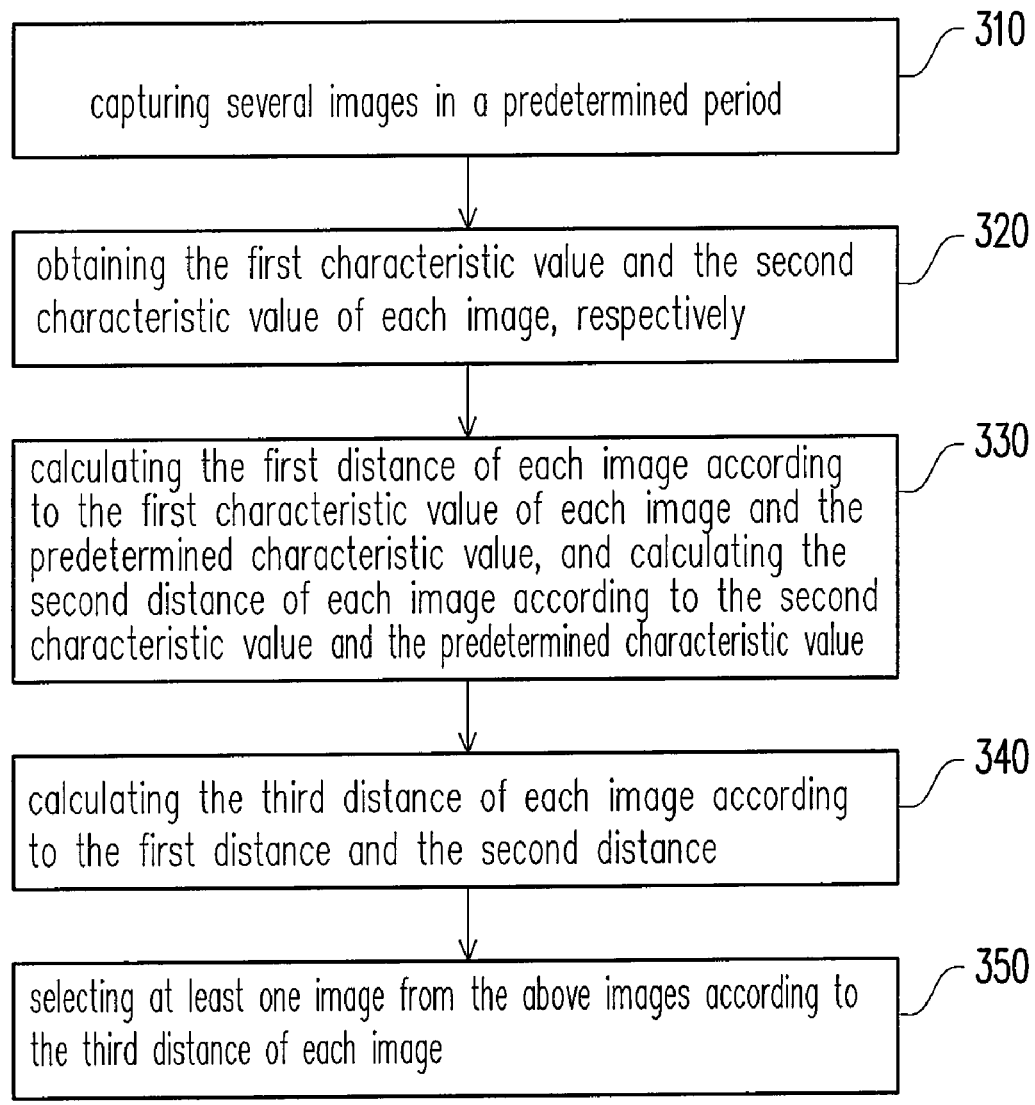
FIG. 3 is a flowchart showing a method for image auto-selection according to another one preferred embodiment of the invention.

FIG. 3 is a flowchart showing a method for image auto-selection according to another preferred embodiment of the invention. As the step 310 shown, firstly, the image capturing unit 110 (such as a web cam) captures several images in a predetermined period. In the embodiment, supposing the captured images includes two persons. And then, in the step 320, the processing unit 120 detects the first facial region and the second facial region on an image through facial detecting technique, and makes facial characters of the first facial region and the second facial region as the first characteristic value and the second characteristic value of the image separately. In the present embodiment, the technique is, for example, Haar Cascade facial detecting method, which is used to detect the first facial region and the second facial region. However, the facial detecting method stated above is not used for limiting the invention, and persons having ordinary skill in the art may use different facial detecting method according to need.

And then, in the step 330, for each image, the first distance of the image is calculated according to the first characteristic value and the predetermined characteristic value of each image, and then the second distance of the image is calculated according to the second characteristic value and the predetermined characteristic value. Because the method of calculating the first distance and the second distance in the embodiment is similar with the embodiment stated above, there is not described for concise purpose.

After the first distance and the second distance separately corresponding to the two facial regions of each image is obtained, as the step 340 shown, the processing unit 120 calculates the third distance of each image according to the first distance and the second distance. For example, the method of calculating the third distance includes using the average value of the first distance and the second distance as the third distance of the image. Besides, the first distance and the second distance separately can be given different weighted ratios according to the size of facial regions on the image. For example, the distance corresponding to the facial region with a larger range of the image has a greater weighted ratio. And then the weighted average value of the first distance and the second distance is used as the third distance of the image according to the weighted ratio.

Finally, as the step 350 shown, after the third distance of each image is calculated, the digital images with least third distance are selected and displayed on the display unit 140 for users to do operations such as manual selecting or storing.

To sum up, the method for image auto-selection and the computer system thereof according to the invention have the following advantages:

First, the invention uses the method of comparing the predetermined characteristic values and the characteristic values of images to determine whether the image should be selected. Therefore, the selection operation is more objective.

Second, auto-selection method replaces the manual selection, which promotes the selecting efficiency greatly.

Third, the result of image selection further fits aesthetic of users by renewing the predetermined characteristic values recorded in the characteristic value database.

Although the invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for image auto-selection comprising the steps of:
   providing a characteristic value database stored in a storage unit of a computer system, wherein the characteristic value database stores at least a predetermined characteristic value;
   capturing, using an image capturing unit of the computer system, a plurality of images in a predetermined period;
   obtaining, using a processing unit of the computer system, a first characteristic value of each of the images, respectively, and calculating a first distance of each of the images according to the first characteristic value of each of the images and the predetermined characteristic value;
   obtaining, using the processing unit, a second characteristic value from each of the images, respectively, calculating a second distance of each of the images according to the second characteristic value of each of the images and each predetermined characteristic value, calculating a third distance of each of the images according to the first distance and the second distance; and
   selecting, using the processing unit, at least an image from the images according to the third distance of each of the images.

2. The method according to claim 1, wherein the step of obtaining the first characteristic value further comprises the steps of:
   detecting a first facial region of the image; and
   capturing a facial characteristic of the first facial region as the first characteristic value.

3. The method according to claim 1, wherein the step of calculating the first distance further comprises the steps of:
   calculating a difference value between the first characteristic value and each predetermined characteristic value; and
   using the average value of the difference values as the first distance of the image.

4. The method according to claim 1, wherein the step of calculating the first distance further comprises the steps of:
   calculating a difference value between the first characteristic value and each predetermined characteristic value; and
   calculating a weighted average value of the difference values as the first distance of the image according to a weighted ratio of each predetermined characteristic value.

5. The method according to claim 1, wherein the step of calculating the first distance further comprises the steps of:
   calculating a difference value between the first characteristic value and each predetermined characteristic value;

selecting a plurality of specific difference values from the difference values according to a selection ratio; and using an average value of the specific difference values as the first distance of the image.

6. The method according to claim 1, wherein the step of obtaining the second characteristic value further comprises the steps of:

detecting a second facial region of the image; and capturing a facial characteristic of the second facial region as the second characteristic value.

7. The method according to claim 1, wherein the step of calculating the second distance further comprises the steps:

calculating a difference value between the second characteristic value and each predetermined characteristic value; and using an average value of the difference values as the second distance of the image.

8. The method according to claim 1, wherein the step of calculating the second distance further comprises the steps of:

calculating a difference value between the second characteristic value and each predetermined characteristic value; and calculating a weighted average value of the difference values as the second distance of the image according to a weighted ratio of each predetermined characteristic value.

9. The method according to claim 1, wherein the step of calculating the second distance further comprises the steps of:

calculating a difference value between the second characteristic value and each predetermined characteristic value;

selecting a plurality of specific difference values from the difference values according to a selection ratio; and using an average value of the specific difference values as the second distance of the image.

10. The method according to claim 1, wherein the step of calculating the third distance comprises the steps of:

using the average value of the first distance and the second distance as the third distance of the image.

11. The method according to claim 1, wherein the step of calculating the third distance comprises the steps of:

calculating a weighted average value of the first distance and the second distance as the third distance of the image according to a weighted ratio of the first distance and the second distance.

12. A computer system comprising:

a storage unit for storing a characteristic value database storing at least one predetermined characteristic value;

an image capturing unit for capturing a plurality of images in a predetermined period; and a processing unit connected to the storage unit and the image capturing unit and used for obtaining a first characteristic value of each of the images, calculating a first distance of each of the images according to the first characteristic value of each of the images and the predetermined characteristic value, respectively obtaining a second characteristic value of each of the images, calculating a second distance of each of the images according to the second characteristic value of each of the images and each predetermined characteristic value, calculating a third distance of each of the images according to the first distance and the second distance, and selecting at least an image from the images according to the third distance of each of the images.

13. The computer system according to claim 12, wherein the processing unit further detects a first facial region on the image and captures a facial characteristic value of the first facial region as the first characteristic value.

14. The computer system according to claim 12, wherein the processing unit calculates a difference value between the first characteristic value and each predetermined characteristic value and uses an average value of the difference values as the first distance of the image.

15. The computer system according to claim 12, wherein the processing unit calculates a difference value between the first characteristic value and each predetermined characteristic value and calculates a weighted average value of the difference values as the first distance of the image according to a weighted ratio of each predetermined characteristic value.

16. The computer system according to claim 12, wherein the processing unit calculates a difference value between the first characteristic value and each predetermined characteristic value, selects a plurality of specific difference values from the difference values according to a selection ratio, and uses an average value of the specific difference values as the first distance of the image.

17. The computer system according to claim 12, wherein the processing unit detects a second facial region of the image and captures a facial characteristic of the second facial region as the second characteristic value.

18. The computer system according to claim 12, wherein the processing unit calculates a difference value between the second characteristic value and each predetermined characteristic value and uses an average value of the difference values as the second distance of the image.

* * * * *